US006810656B2

United States Patent
Kortum et al.

(10) Patent No.: US 6,810,656 B2
(45) Date of Patent: Nov. 2, 2004

(54) THRUST REVERSER SYSTEM POWER DRIVE UNIT WITH DUAL SEQUENTIAL TORQUE DECOUPLER AND METHOD

(75) Inventors: Robert D. Kortum, Mesa, AZ (US); Andrew T. Johnson, Scottsdale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 51 days.

(21) Appl. No.: 10/317,885

(22) Filed: Dec. 12, 2002

(65) Prior Publication Data

US 2004/0112040 A1 Jun. 17, 2004

(51) Int. Cl.[7] .............................. F02K 1/54; H02K 7/00; F16D 21/08
(52) U.S. Cl. ............. 60/226.2; 244/110 B; 239/265.19; 239/265.25; 192/54.1; 192/48.7; 310/78
(58) Field of Search ..................... 60/226.2; 244/110 B; 239/265.19–265.33; 192/103 R–104 F, 48.1, 48.7, 54.1, 56.51, 56.5, 70.21; 310/78, 95, 100

(56) References Cited

U.S. PATENT DOCUMENTS

| | | |
|---|---|---|
| 1,199,612 A | 9/1916 | Rice |
| 2,015,688 A | 10/1935 | Ney |
| 22,552 A | 3/1947 | Swift, Jr. |
| 2,441,052 A | 5/1948 | Wilmer |
| 2,660,281 A | 11/1953 | Ochtman |
| 2,740,510 A * | 4/1956 | Berthold ................... 192/12 D |
| 2,819,589 A | 1/1958 | Geyer |
| 3,082,684 A | 3/1963 | Sturta |
| 3,300,004 A * | 1/1967 | Peterson .................... 192/48.7 |
| 3,306,406 A * | 2/1967 | Poliseo .................... 192/104 R |
| 3,367,456 A | 2/1968 | Bohnhoff |
| 3,555,318 A * | 1/1971 | Ranzi ......................... 310/78 |
| 3,596,740 A | 8/1971 | Nau |
| 3,653,226 A | 4/1972 | Westbury |
| 3,831,400 A | 8/1974 | Morin |
| 3,921,770 A * | 11/1975 | Daab et al. ................ 192/12 D |
| 4,030,578 A | 6/1977 | Cacciola et al. |
| 4,196,799 A | 4/1980 | Taylor et al. |
| 4,273,006 A | 6/1981 | Woodbury |
| 4,273,388 A | 6/1981 | Muller |
| 4,318,304 A | 3/1982 | Lang |
| 4,346,793 A | 8/1982 | Fuse et al. |
| 4,442,928 A | 4/1984 | Eastman |
| 4,458,582 A | 7/1984 | Linton |
| 4,459,121 A | 7/1984 | Gazzera et al. |
| 4,459,867 A | 7/1984 | Jones |
| 4,531,617 A | 7/1985 | Martin et al. |
| 4,543,783 A | 10/1985 | Greüne et al. |
| 4,545,470 A | 10/1985 | Grimm |
| 4,556,131 A | 12/1985 | Chapman |
| 4,579,039 A | 4/1986 | Ebbing |
| 4,625,843 A | 12/1986 | Maltby et al. |
| 4,693,349 A | 9/1987 | Tysver |
| 4,736,807 A | 4/1988 | Davis |
| 4,871,296 A | 10/1989 | Laessle et al. |
| 4,898,265 A | 2/1990 | Metcalf |
| 4,905,805 A | 3/1990 | Grimm |
| 4,944,379 A | 7/1990 | Haaser |
| 5,046,376 A | 9/1991 | Baker |
| 5,145,041 A | 9/1992 | Hirai |
| 5,280,704 A | 1/1994 | Anderson et al. |

(List continued on next page.)

Primary Examiner—Ted Kim
(74) Attorney, Agent, or Firm—Douglas A. Mullen, Esq.

(57) ABSTRACT

A thrust reverser system that includes one or more power drive units operable to supply a drive force. The power drive unit includes a motor and at least two output sections, each operably coupled to transmit the drive force to the thrust reverser movable components. Each of the output sections is operable to decouple the motor from associated thrust reverser movable components upon a torque magnitude being reached in the output section. A deadband coupler is provided to couple the first and second output sections together a time period after the torque magnitude is reached in one of the output sections.

28 Claims, 6 Drawing Sheets

U.S. PATENT DOCUMENTS

| | | | |
|---|---|---|---|
| 5,359,848 A | | 11/1994 | Davies |
| 5,360,091 A | * | 11/1994 | Sommer ................. 192/103 R |
| 5,545,109 A | | 8/1996 | Hayakawa |
| 5,609,020 A | | 3/1997 | Jackson et al. |
| 5,630,490 A | | 5/1997 | Hudson et al. |
| 5,631,511 A | * | 5/1997 | Schulmann et al. .......... 310/78 |
| 5,655,636 A | | 8/1997 | Lang et al. |
| 5,769,362 A | | 6/1998 | Greene et al. |
| 5,811,139 A | | 9/1998 | Hehl |
| 5,901,817 A | | 5/1999 | Gitnes |
| 5,944,148 A | | 8/1999 | Bae et al. |
| 5,950,774 A | | 9/1999 | Lang et al. |
| 5,957,798 A | | 9/1999 | Smith, III et al. |
| 6,044,943 A | | 4/2000 | Bytzek et al. |
| 6,059,085 A | | 5/2000 | Farnsworth |
| 6,202,803 B1 | | 3/2001 | Lang |
| 6,209,690 B1 | | 4/2001 | Kuivamaki et al. |
| 6,240,797 B1 | | 6/2001 | Morishima et al. |
| 6,286,784 B1 | * | 9/2001 | Hardy et al. ................ 60/226.2 |
| 6,332,842 B1 | | 12/2001 | Tabuchi et al. |
| 6,358,152 B2 | | 3/2002 | Casutt |
| 6,401,557 B1 | | 6/2002 | Davies |
| 6,487,846 B1 | * | 12/2002 | Chakkera et al. .......... 60/226.2 |
| 6,494,033 B1 | | 12/2002 | Davies |
| 2002/0134160 A1 | | 9/2002 | Gorin et al. |
| 2003/0006119 A1 | | 1/2003 | Harvey |

* cited by examiner

THRUST REVERSER SYSTEM POWER DRIVE UNIT WITH DUAL SEQUENTIAL TORQUE DECOUPLER AND METHOD

FIELD OF THE INVENTION

The present invention relates to aircraft engine thrust reverser actuation systems and, more particularly, to a decoupler that is used to limit the torque in an aircraft thrust reverser drive train that is driven by a dual output power drive unit.

BACKGROUND OF THE INVENTION

When a jet-powered aircraft lands, the landing gear brakes and aerodynamic drag (e.g., flaps, spoilers, etc.) of the aircraft may not, in certain situations, be sufficient to slow the aircraft down in the required amount of runway distance. Thus, jet engines on most aircraft include thrust reversers to enhance the braking of the aircraft. When deployed, a thrust reverser redirects the rearward thrust of the jet engine to a generally or partially forward direction to decelerate the aircraft. Because at least some of the jet thrust is directed forward, the jet thrust also slows down the aircraft upon landing.

Various thrust reverser designs are commonly known, and the particular design utilized depends, at least in part, on the engine manufacturer, the engine configuration, and the propulsion technology being used. Thrust reverser designs used most prominently with jet engines fall into three general categories: (1) cascade-type thrust reversers; (2) target-type thrust reversers; and (3) pivot door thrust reversers. Each of these designs employs a different type of moveable thrust reverser component to change the direction of the jet thrust.

Cascade-type thrust reversers are normally used on high-bypass ratio jet engines. This type of thrust reverser is located on the circumference of the engine's midsection and, when deployed, exposes and redirects air flow through a plurality of cascade vanes. The moveable thrust reverser components in the cascade design includes several translating sleeves or cowls ("transcowls") that are deployed to expose the cascade vanes.

Target-type reversers, also referred to as clamshell reversers, are typically used with low-bypass ratio jet engines. Target-type thrust reversers use two doors as the moveable thrust reverser components to block the entire jet thrust coming from the rear of the engine. These doors are mounted on the aft portion of the engine and may form the rear part of the engine nacelle.

Pivot door thrust reversers may utilize four doors on the engine nacelle as the moveable thrust reverser components. In the deployed position, these doors extend outwardly from the nacelle to redirect the jet thrust.

The primary use of thrust reversers is, as noted above, to enhance the braking of the aircraft, thereby shortening the stopping distance during landing. Hence, thrust reversers are usually deployed during the landing process to slow the aircraft. Thereafter, when the thrust reversers are no longer needed, they are returned to their original, or stowed, position. In the stowed position, the thrust reversers do not redirect the jet engine's thrust.

The moveable thrust reverser components in each of the above-described designs are moved between the stowed and deployed positions by actuators. Power to drive the actuators may come from a dual output power drive unit (PDU), which may be electrically, hydraulically, or pneumatically operated, depending on the system design. A drive train that includes one or more drive mechanisms, such as flexible rotating shafts, may interconnect the actuators and the PDU to transmit the PDU's drive force to the moveable thrust reverser components.

Each of the above-described thrust reverser system configurations is robustly designed and is safe and reliable. Nonetheless, analysis has shown that secondary damage to various portions of the thrust reverser system may result under certain postulated conditions. For example, if one of the actuators coupled to one of the PDU outputs becomes jammed, it is postulated that all of the drive force supplied from the PDU would be concentrated, via the synchronization mechanisms, on the jammed actuator. This postulated condition may result in damage to the actuator system components, including the PDU, actuators, drive mechanisms, or the moveable thrust reversers components. Repairing such damage can be costly and result in aircraft down time. One solution is to use stronger components, but this increases the cost and/or weight of the thrust reverser system. Another solution is to include numerous, independently operated torque limiters or decouplers in each drive train coupled to the PDU outputs. However, this solution may also increase system cost and/or weight.

Accordingly, there is a need for a thrust reverser system that improves upon one or more of the drawbacks identified above. Namely, a system that reduces the likelihood of component damage if thrust reverser system fails, for example, by a jammed actuator, without significantly increasing the cost and/or the weight of the thrust reverser system components. The present invention addresses one or more of these needs.

SUMMARY OF THE INVENTION

The present invention provides a system and method that sequentially decouples a dual output thrust reverser system PDU assembly from its load in the event a torque magnitude is reached between the assembly and load. Thus, the present invention reduces the likelihood of component damage without significantly increasing the cost and/or weight of the system.

In one embodiment, and by way of example only, a thrust reverser control system includes a power drive unit operable to supply a drive force, at least two drive mechanisms, and at least two actuator assemblies. The drive mechanisms are each coupled to receive the drive force, and each actuator assembly is coupled to at least one of the drive mechanisms and operable to move, upon receipt of the drive force, between a stowed position and a deployed position. The power drive unit includes a motor, first and second output sections, and a deadband coupler. The motor has a shaft with at least a first output and a second output and is operable to supply rotational power to a first and a second load, respectively. The first output section is coupled to the first motor output and is operable to decouple the motor from the first load upon a torque magnitude being reached in the first output section. The second output section is coupled to the second motor output and is operable to decouple the motor from the second load upon a torque magnitude being reached in the second output section. The deadband coupler is coupled to the first and second output sections and is operable to selectively couple the first and second output sections together a time period after the first and second output sections have unequal rotational speeds.

In another exemplary embodiment, a power drive unit includes a motor, first and second output sections, and a deadband coupler. The motor has at least a first output and a second output and is operable to supply rotational power to a first and a second load, respectively. The first output section is coupled to the first motor output and is operable to decouple the motor from the first load upon a torque magnitude being reached in the first output section. The second output section is coupled to the second motor output and is operable to decouple the motor from the second load upon a torque magnitude being reached in the second output section. The deadband coupler is coupled to the first and second output sections and is operable to selectively couple the first and second output sections together a time period after the first and second output sections have unequal rotational speeds.

In still another exemplary embodiment, in a thrust reverser control system including a power drive unit having at least a first and a second output section each coupled to at least one thrust reverser movable component, respectively, a method of operating the system includes rotating the power drive unit first and second output sections to move the thrust reverser movable components between a stow and a deploy position. One of the power drive unit output sections is decoupled from its associated thrust reverser movable component upon a torque magnitude being reached therebetween. The other power drive unit output section is then decoupled from its associated thrust reverser movable component a time period after the power drive unit output sections have unequal rotational speeds.

In yet another exemplary embodiment, in a power drive unit including a motor having at least a first and a second output coupled to at least a first and a second power drive unit output section, respectively, a method of operating the power drive unit includes rotating the first and second motor outputs to thereby rotate the power drive unit first and second output sections. One of the power drive unit output sections is decoupled from its respective motor output upon a torque magnitude being reached therebetween. The other power drive unit output section is then decoupled from its respective motor output a time period after the power drive unit output sections have unequal rotational speeds.

In yet another exemplary embodiment, a thrust reverser system includes first and a second actuator assemblies, first and second drive mechanisms, and a deadband coupler. The first and second drive mechanisms are operably coupled to the first and second actuators, respectively, and are adapted to rotate upon receipt of a rotational drive force. The deadband coupler is operably coupled between the first and second drive mechanisms and is operable to selectively couple the first and second drive mechanisms together a time period after the first and second drive mechanisms have unequal rotational speeds.

Other independent features and advantages of the preferred system and method will become apparent from the following detailed description, taken in conjunction with the accompanying drawings which illustrate, by way of example, the principles of the invention.

DETAILED DESCRIPTION OF PREFERRED EMBODIMENTS

Before proceeding with the detailed description, it is to be appreciated that the described embodiment is not limited to use in conjunction with a specific thrust reverser system design. Thus, although the description is explicitly directed toward an embodiment that is implemented in a cascade-type thrust reverser system, in which transcowls are used as the moveable thrust reverser component, it should be appreciated that it can be implemented in other thrust reverser actuation system designs, including those described above and those known now or hereafter in the art.

Figure 1:
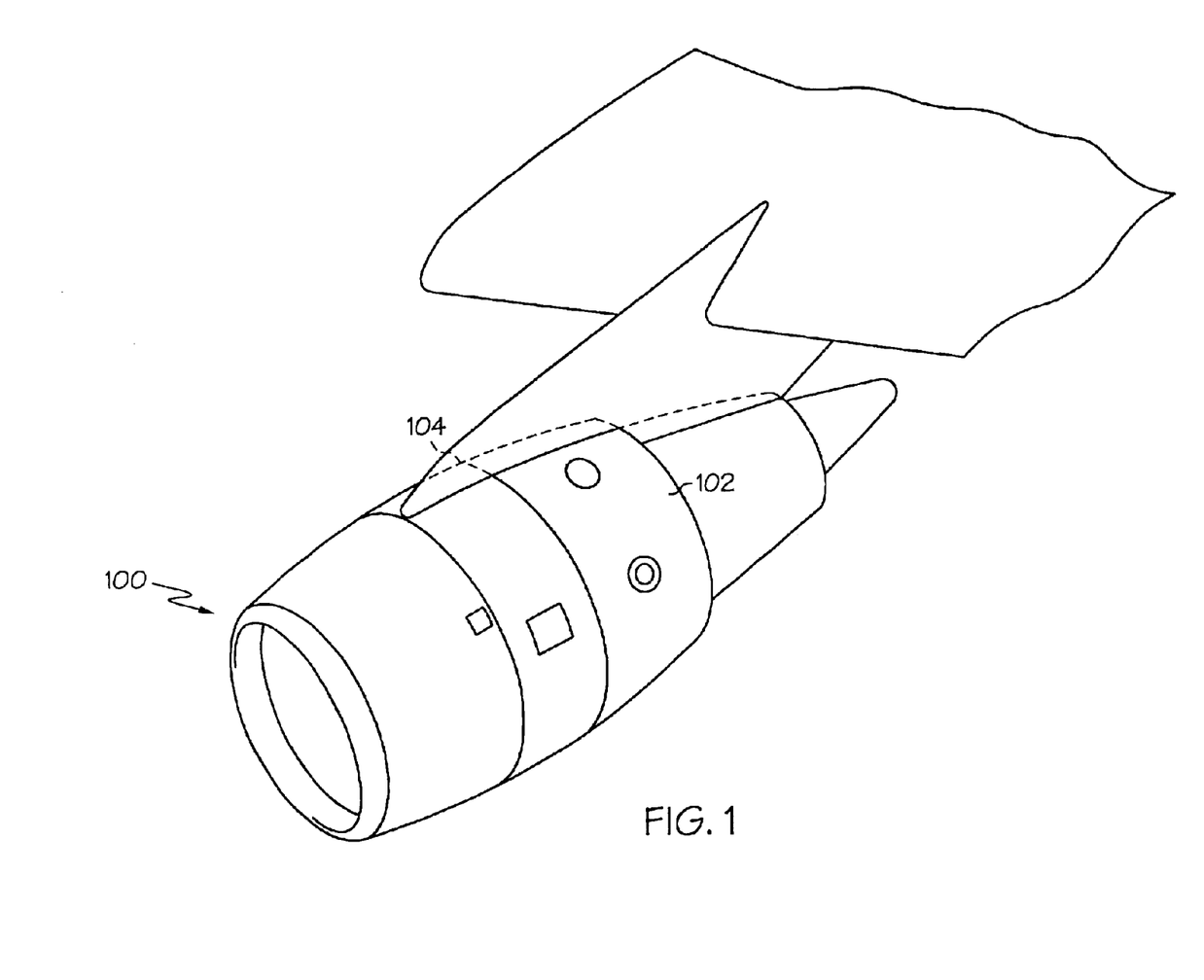
FIG. 1 is a perspective view of portions of an aircraft jet engine fan case.

Turning now to the description, and with reference first to FIG. 1, a perspective view of portions of an aircraft jet engine fan case 100 that incorporates a cascade-type thrust reverser is depicted. The engine fan case 100 includes a pair of semi-circular transcowls 102 and 104 that are positioned circumferentially on the outside of the fan case 100. The transcowls 102 and 104 cover a plurality of non-illustrated cascade vanes. A mechanical link 202 (see FIG. 2), such as a pin or latch, may couple the transcowls 102 and 104 together to maintain the transcowls 102 and 104 in correct alignment on non-illustrated guides on which the transcowls 102 and 104 translate. When the thrust reversers are commanded to deploy, the transcowls 102 and 104 are translated aft. This, among other things, exposes the cascade vanes, and causes at least a portion of the air flowing through the engine fan case 100 to be redirected in a forward direction. This re-direction of air flow in a forward direction creates a reverse thrust and, thus, works to slow the airplane.

Figure 2:
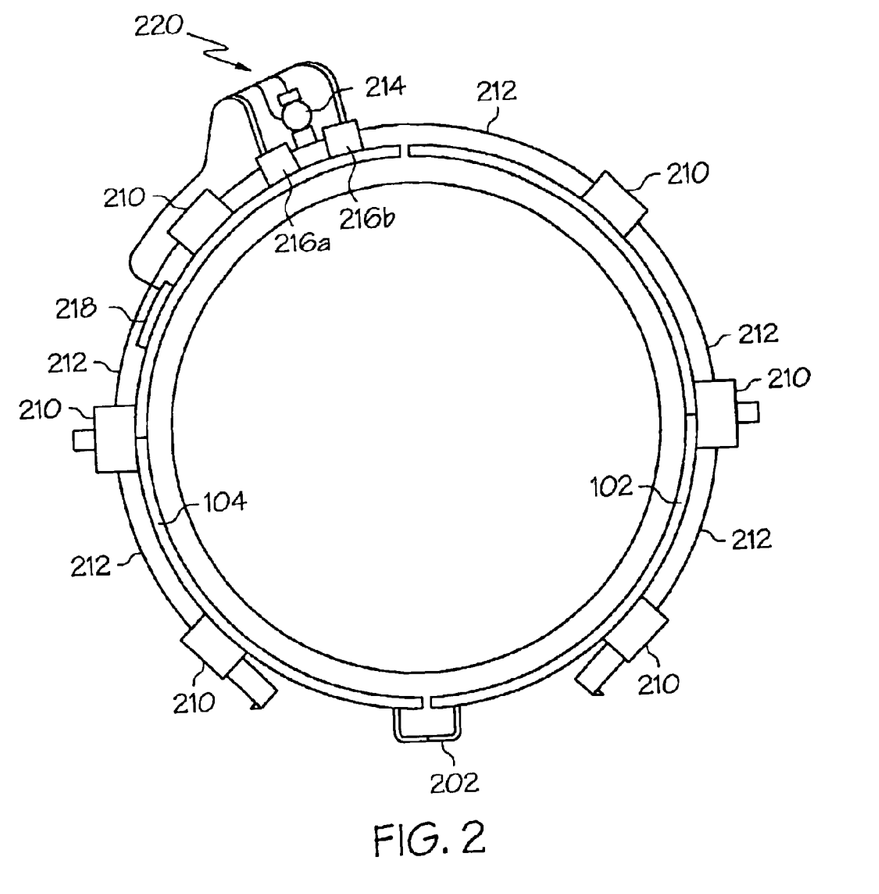
FIG. 2 is a simplified end view of a thrust reverser actuation system according to an exemplary embodiment of the present invention.

As shown more clearly in FIG. 2, a plurality of actuators 210 are individually coupled to the transcowls 102 and 104. In the depicted embodiment, half of the actuators 210 are coupled to one of the transcowls 102, and the other half are coupled to another transcowl 104. While not critical to understand or enable the present invention, it is noted that some or all of the actuators 210 may include locks, some or all of which may include position sensors. In addition, the transcowls 102 and 104 may also, or alternatively, each include locks. It is noted that the actuators 210 may be any one of numerous actuator designs presently known in the art or hereafter designed. However, in this embodiment the actuators 210 are ballscrew actuators. It is additionally noted that the number and arrangement of actuators 210 is not limited to what is depicted in FIG. 2, but could include other numbers of actuators 210 as well. The number and arrangement of actuators is selected to meet the specific design requirements of the system.

The actuators 210 are interconnected via a plurality of drive mechanisms 212, each of which, in the particular depicted embodiment, is a flexible shaft. Using flexible shafts 212 in this configuration ensures that the actuators 210 and the transcowls 102 and 104 move in a substantially synchronized manner. For example, when one transcowl 102 is moved, the other transcowl 104 is moved a like distance at substantially the same time. Other synchronization mechanisms that may be used include electrical synchronization or open loop synchronization, or any other mechanism or design that transfers power between the actuators 210.

A power drive unit (PDU) assembly 220 having at least two output sections, a first output section 216a and a second output section 216b, is coupled to the actuators 210 via one or more flexible shafts 212. In the depicted embodiment, the PDU assembly 220 includes a dual output motor 214 that is coupled to the two output sections 216a, 216b. The motor 214 may be any one of numerous types of motors such as, for example, an electric (including any one of the various DC or AC motor designs known in the art), a hydraulic, or a pneumatic motor. The first 216a and second 216b output sections are each coupled between an output of the motor 214 and one of the flexible shafts 212. Moreover, though not explicitly depicted, the PDU assembly 220 may include a lock mechanism. In any case, with the depicted arrangement, the rotation of the PDU assembly 220 results in the synchronous operation of the actuators 210, via the flexible shafts 212, thereby causing the transcowls 102 and 104 to move at substantially the same rate.

The PDU assembly 220 is controlled by a control circuit 218. The control circuit 218 receives commands from a non-illustrated engine control system such as, for example, a FADEC (full authority digital engine control) system, and provides appropriate activation signals to the PDU assembly 220 in response to the received commands. In turn, the PDU assembly 220 supplies a drive force to the actuators 210 via the flexible shafts 212. As a result, the actuators 210 cause the transcowls 102 and 104 to translate between the stowed and deployed positions.

Turning now to FIGS. 3–10, a description of various embodiments of the PDU assembly 220 and its operation will be provided. Beginning with FIG. 3, which depicts a functional schematic representation of the PDU assembly 220, a general description of the PDU assembly 220 and its operation will first be provided. Thereafter, a more detailed description of various embodiments of the PDU assembly 220 will be provided.

Figure 3:
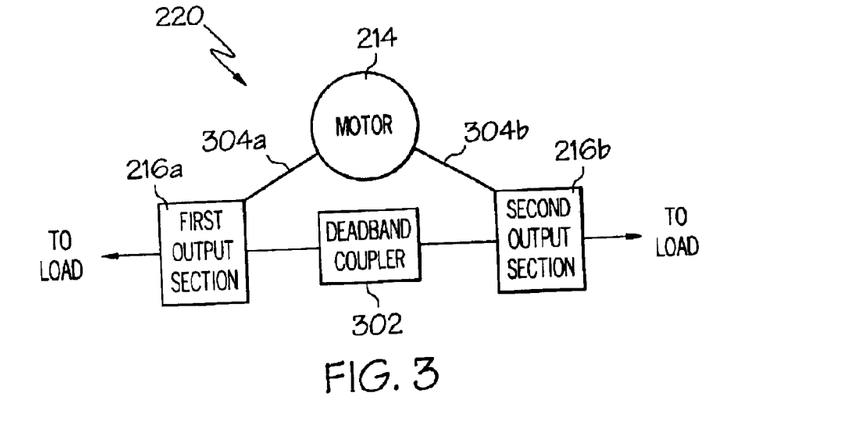
FIG. 3 is a simplified functional schematic diagram of a power drive unit assembly according to an exemplary embodiment of the present invention that may be used in the system of FIG. 2.

As shown in FIG. 3, the PDU assembly 220 includes the motor 214, the output sections 216a, 216b, and a deadband coupler 302. The motor 214, as was alluded to above, includes at least two outputs, a first output 304a and a second output 304b. The first output section 216a is coupled to the motor first output 304a, and the second output section 216b is coupled to motor second output 304b. In addition, the first 216a and second 216b output sections are each adapted to couple to a load such as, for example, the above-mentioned device mechanisms 212 and one or more actuators 210. The deadband coupler 302 is coupled to the first 216a and second 216b output sections.

As was noted above, the PDU assembly 220, when installed in a thrust reverser actuation system, supplies a drive force to the actuators 210. While the PDU assembly 220 is supplying the drive force, if the torque in the first (or second) output section 216a (or 216b) exceeds a magnitude due, for example, to a jammed actuator 210, then the first (or second) output section 216a (or 216b) will decouple the first (or second) motor output 304a (or 304b) from the drive mechanisms 212 and the jammed actuator 210. Thereafter, if the motor 214 continues rotating, the output sections 216a and 216b will rotate at unequal speeds, and relative rotation will exist between the first and second output sections 216a and 216b. After a deadband time period, the deadband coupler 302 couples the first 216a and second 216b output sections together. When this occurs, the torque in the second (or first) output section 216b (or 216a) will then exceed the torque magnitude, and decouples the motor second (or first) output 304b (or 304a) from the drive mechanisms 212. As a result, the PDU assembly 220 is fully decoupled from the load.

Sequentially decoupling both motor outputs 304a and 304b from the respective drive mechanisms 212 when the torque magnitude in one of the output sections 216a or 216b reaches the magnitude reduces the likelihood of any additional component damage. If only one of the motor outputs 304a or 304b were decoupled by, for example, including only a single torque limiter device, the output section 304a or 304b that was not decoupled would continue supplying the drive force to its respective drive mechanism 212. If the thrust reverser transcowl halves 102 and 104 are linked by, for example, the mechanical link 202, the non-decoupled output section 304a or 304b would continue to drive, or attempt to drive, the transcowl half 102 or 104 to which it is coupled. This could result in additional damage. In addition, if a single torque limiter were used to decouple both output sections 216a and 216b, the torque limiter would have to have a torque limit set point that is significantly higher than with two torque limiters, to prevent nuisance decouplings. Thus, the motor outputs 304a and 304b and the output sections 216a and 216b may need to be more robustly designed to withstand higher torque limits, which can increase system size, weight, and/or cost.

Figure 4:
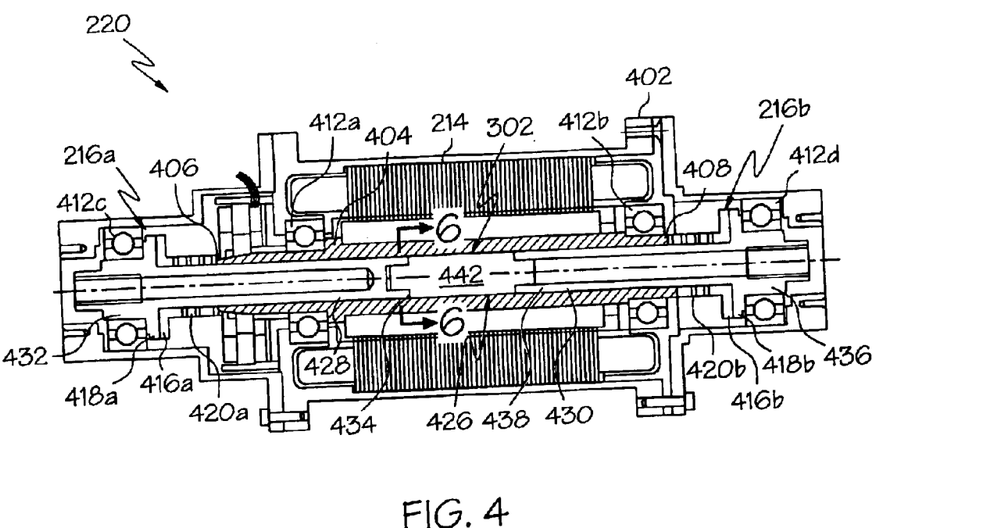
FIG. 4 is detailed cross section view of an exemplary embodiment of the power drive unit of FIG. 3.

With reference now to FIG. 4, a detailed description of a particular embodiment of the PDU assembly 220 will be provided. The depicted PDU assembly 220 includes a housing 402, which may be constructed of one or more pieces. The motor 214 is mounted within the housing 402, and includes a shaft 404 having a first end 406 and a second end 408. The shaft 404 is rotationally mounted within the housing 402 by first 412a and second 412b bearing assemblies. In the depicted embodiment, the first 216a and second 216b output sections include first 216a and second 216b torque decouplers, which are also mounted within the housing 402. The first and second torque decouplers 216a, 216b, each include an input section 416a, 416b and an output section 418a, 418b. The first torque decoupler input section 416a is coupled to the motor shaft first end 406, and the second torque decoupler input section 416b is coupled to the motor shaft second end 408, via first and second gimbal springs 420a, 420b, respectively. The gimbal springs 420a, 420b supply a preload that biases the torque decoupler input sections 416a, 416b toward their respective output sections 418a, 418b. The first and second torque decoupler output sections 418a, 418b are rotationally mounted within the housing 402 by third 412c and fourth 412d bearing assemblies, respectively.

Figure 5:
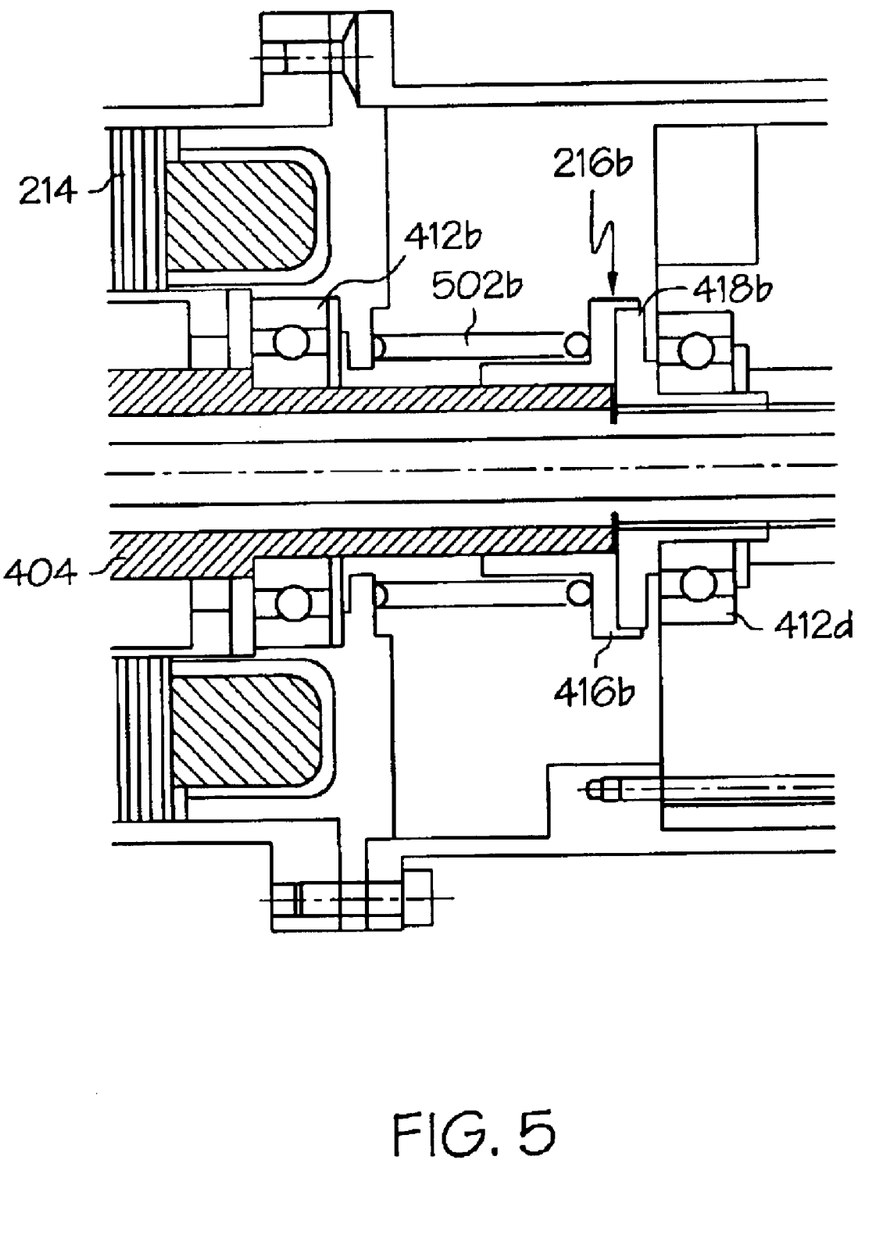
FIG. 5 is a partial cross section view of the power drive unit of FIG. 4 showing an alternate configuration thereof.

In an alternate embodiment, a portion of which is shown in FIG. 5, the first 420a and second 420b gimbal springs are not included. Instead, the motor shaft first 406 and second 408 ends are coupled to the first 416a and second 416b torque decoupler input sections, respectively, and biasing springs 502a, 502b (only 502b shown) are used to bias the torque decoupler input sections 416a, 416b toward their respective output sections 418a, 418b. However, the use of gimbal springs is preferred, since this reduces the likelihood of frictional forces.

Returning now to FIG. 4, the deadband coupler 302 may be constructed in any one of numerous configurations. In the embodiment depicted in FIG. 4, the deadband coupler 302 is a quill shaft assembly 426 that is coupled to the first 418a and second 418b torque decoupler output sections. The quill shaft assembly 426 includes a first quill shaft 428, a second quill shaft 430, and a deadband stop 442. The first quill shaft 428 has a first end 432 and a second end 434. The first end 432 is coupled to the first torque decoupler output section 418a. As shown more clearly in FIG. 6, in this particular depicted embodiment, the first quill shaft second end 434 includes two or more prongs, forks, or gear sections 435a, 435b, and rotates free of contact during normal PDU assembly 220 operations. Similarly, the second quill shaft 430 has a first end 436 and a second end 438. The second quill shaft first end 436 is coupled to the second torque decoupler output section 418b. The second quill shaft second end 438 also includes two or more prongs, forks, or gear sections 435a, 435b, and rotates free of contact during normal PDU assembly 220 operations. The deadband stop 442 is coupled to, or is integrally formed with, the shaft 404, and includes two or more quill shaft contacts 444 that are spaced apart from the first and second quill shaft second ends 434 and 438 during normal PDU assembly 220 operations.

Figure 6:
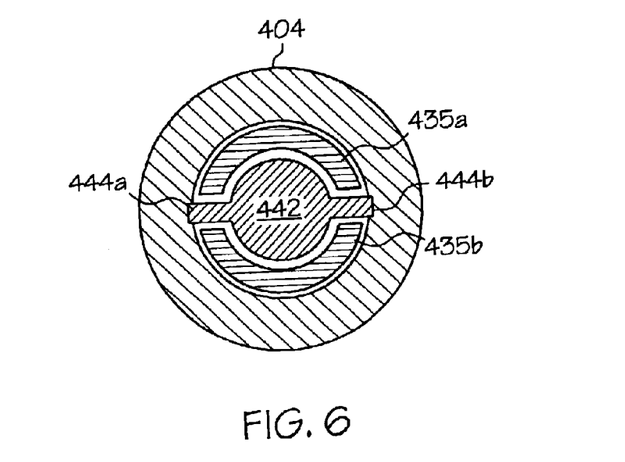
FIG. 6 is a cross section view of the power drive unit of FIG. 4 taken along line 6—6 in FIG. 4.

During normal operations of the PDU assembly 220 depicted in FIGS. 4–6, the forks, prongs, or gear sections 435a, 435b on the second ends 434, 438 of the first 428 and second 430 quill shafts rotate free of contact with the deadband stop contact surfaces 444. Thus, rotation of the motor 214 during normal operation causes the first 216a and second 216b torque decouplers to rotate in unison, which in turn causes the first 428 and second 430 quill shafts to rotate in unison with one another, and in unison with the deadband stop 442. If, however, the load on the PDU assembly 220 causes the torque in, for example, the first torque decoupler 216a to reach or exceed a first magnitude, then the first torque decoupler input section 416a will decouple from its output section 418a. This will cause the first quill shaft 428 to no longer rotate in unison with the second quill shaft 430 and the deadband stop 442. As a result, after some period of time, the second quill shaft second end 438 contacts and/or meshes with the deadband stop contact surfaces 444, which couples the first 418a and second 418b decoupler output sections together. With the first 418a and second 418b torque decoupler output sections coupled together, the torque in the second torque decoupler 216b will then reach or exceed a second torque magnitude (which may be substantially equal to the first torque magnitude), and decouple its input section 416b from its output section 418b. At this time, the PDU assembly 220 is completely unloaded. It will be appreciated that the time for the first and second quill shaft second ends 434, 436 to contact and/or mesh with the deadband stop contact surfaces 444 may be adjusted by, for example, adjusting the amount of angular displacement between the quill shaft second ends 434, 436 and the contact surfaces 444.

Figure 7:
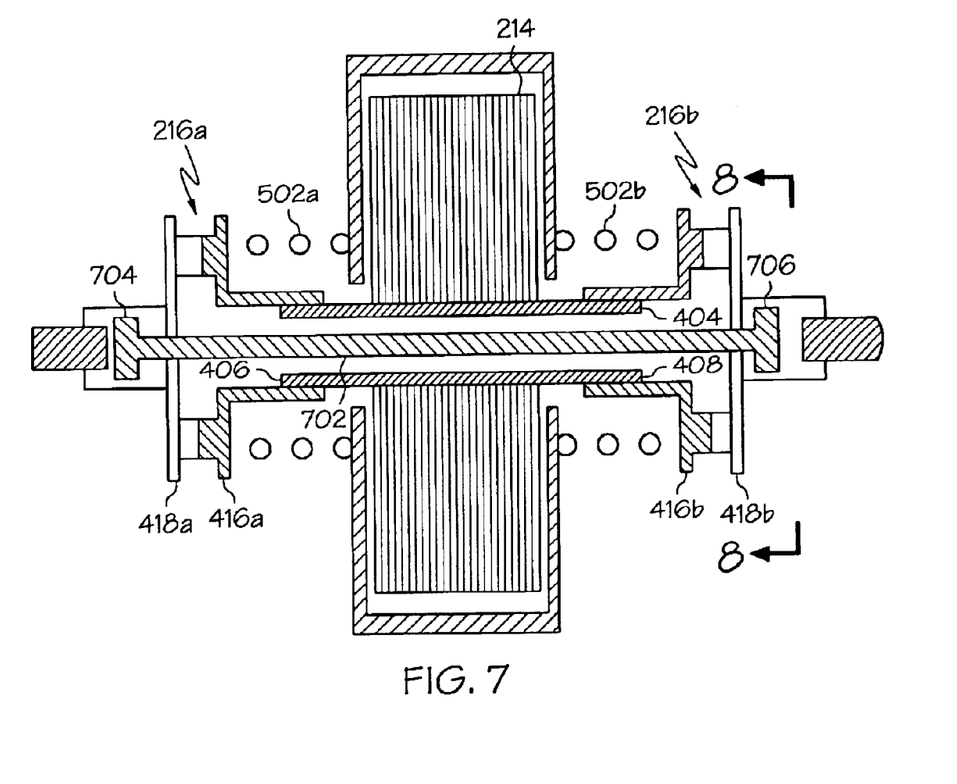
FIG. 7 is a simplified depiction of an alternate configuration of the power drive unit of FIG. 3.
Figure 8:
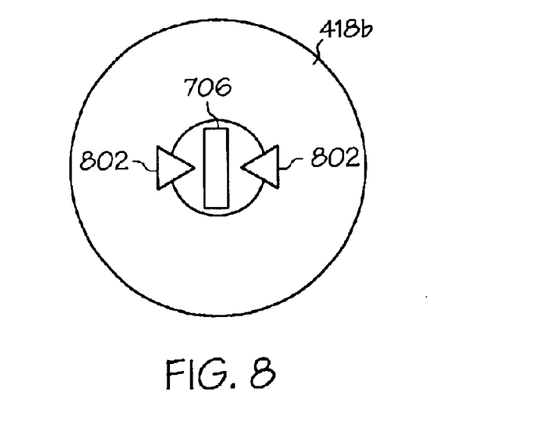
FIG. 8 is a cross section view of a portion of the power drive unit of FIG. 6 taken along line 8—8 in FIG. 7.

As was noted above, the deadband coupler 302 is not limited to the quill shaft assembly shown in FIGS. 4 and 6, but could be any one of numerous other devices and/or mechanisms that provide the same functionality. For example, FIGS. 7 and 8 depict a simplified diagram of a PDU assembly 220 that includes one such alternative deadband coupler configuration. In this configuration, the deadband coupler 302 is a quill shaft assembly 702 that is substantially unitary in construction. It will be appreciated that the quill shaft assembly 702 could be unitarily constructed of multiple sections. The quill shaft assembly 702 has a first end 704 that is coupled to the first torque decoupler output section 418a, and a second end 706 that is rotationally mounted within the second torque decoupler output section 418b. It will be appreciated that either end of the quill shaft assembly 702 could be rigidly coupled to its output section 418a, 418b, while the opposite end is rotationally mounted.

As with the alternate embodiment of FIG. 5, in this particular embodiment, the motor shaft first 406 and second 408 ends are directly coupled to the first 416a and second 416b torque decoupler input sections, respectively, and first and second springs 502a, 502b bias the torque decoupler input sections 416a, 416b toward their respective output sections 418a, 418b. It will be appreciated, however, that gimbal springs could instead be used, as with the embodiment depicted in FIG. 3. In addition, as shown most clearly in FIG. 8, the second torque decoupler output section 418b includes a plurality of deadband stops 802. It will be appreciated that either or both decoupler output sections 418a, 418b could include the deadband stops 802. Moreover, although two diametrically opposed deadband stops 802 are illustrated, it will be appreciated that the number and/or spacing of the deadband stops may be varied to implement the desired deadband time period.

During normal operation of the PDU assembly 220 shown in FIG. 8, the quill shaft assembly 702 rotates in synchronism with the motor shaft 402, and does not contact the deadband stops 802. If the torque in the first torque decoupler 216a reaches or exceeds a first magnitude, then the first torque decoupler input section 416a will decouple from its output section 418a. As a result, the quill shaft assembly 702 will not rotate in synchronism with the motor shaft 402. After a time period, the quill shaft second end 706 will contact the deadband stops 802 in the second torque decoupler output section 418b, coupling the first 418a and second 418b torque decoupler output sections together. With the first 418a and second 418b torque decoupler output sections coupled together, the torque in the second decoupler 216b will then reach or exceed a second torque magnitude (which may be substantially equal to the first torque magnitude), and decouple its input section 416b from its output section 418b. At this time, the PDU assembly 220 is completely unloaded.

Similar to the sequence described above, if the torque in the second decoupler 216b reaches the second torque magnitude first, then the second torque decoupler input section 416b will decouple from its output section 418b. As a result, the second torque decoupler output section 418b will not rotate in synchronism with the motor shaft 402 and, thus, the quill shaft assembly 702. After the time period, the quill shaft second end 706 will contact the deadband stops 802 in the second torque decoupler output section 418b, coupling the first 418a and second 418b torque decoupler output sections together. With the first 418a and second 418b torque decoupler output sections coupled together, the torque in the first torque decoupler 216a will then reach or exceed the first torque magnitude, and decouple its input section 416a from its output section 418a, leaving the PDU assembly 220 completely unloaded.

In addition to the various embodiments explicitly illustrated and described, it will be appreciated that various other deadband coupler configurations may also be used to implement the described functionality. For example, the first and second quill shafts could be configures so that, during normal operations, the ends of each at least partially overlap, are angularly displaced from, and do not contact, one another.

Figure 9:
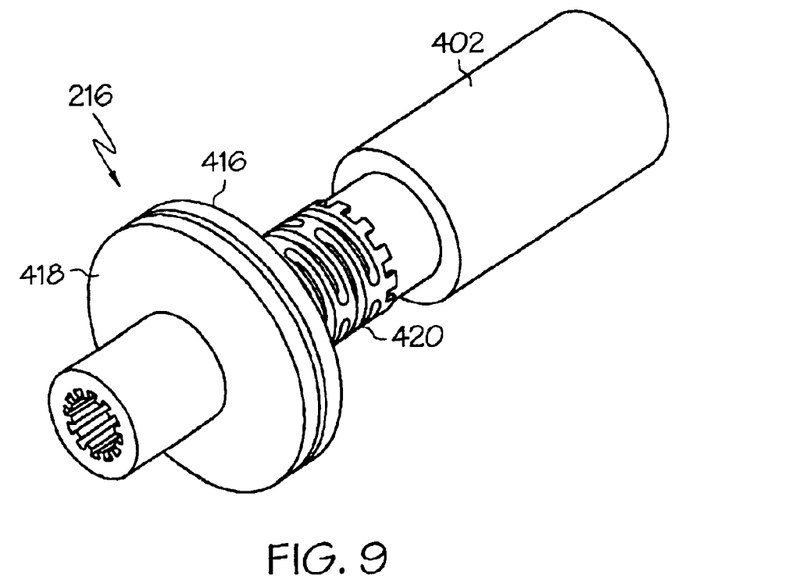
FIGS. 9 and 10 are exemplary embodiments of output sections that may be used to implement the power drive units illustrated in FIGS. 3–8.
Figure 10:
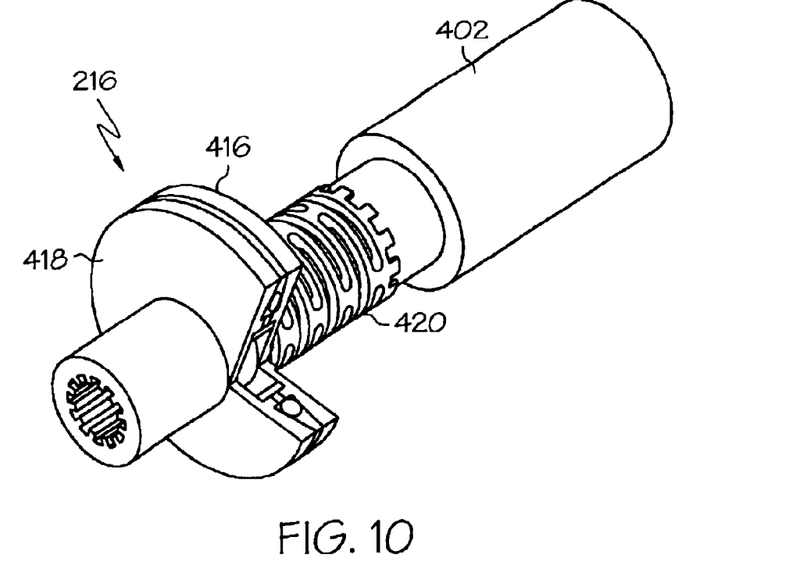

In addition to various deadband coupler configurations, it will be appreciated that the torque decouplers 216a, 216b may also be variously configured. Two particular embodiments of a torque decoupler 216 that may be used in the PDU assembly 220 are shown in FIGS. 9 and 10. In the embodiment shown in FIG. 9, the torque decoupler 216 is a toothed-clutch type of decoupler, and in the embodiment shown in FIG. 10, the torque decoupler is a ball-and-ramp type of decoupler. Both of these decoupler configurations are known in the art and will, therefore, not be described in detail. It will be appreciated that the torque decouplers 216a, 216b are not limited to those illustrated in FIGS. 9 and 10, but that various other configurations may also be used.

Furthermore, it will be appreciated that the first 216a and second 216b output sections are not limited to the implementations explicitly depicted and described above. By way of non-limiting example, the output sections could be either hydraulically operated, electrically operated, or a combination of both. The output sections could include any one of numerous torque sensors and the hydraulically and/or electrically operated output sections could operate in response to the sensors.

The PDU assembly 220 described above reduces the likelihood of component damage if a coupled load, such as a thrust reverser actuator, jams, without significantly increasing the cost and/or the weight of the thrust reverser system and/or the system components.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A thrust reverser control system, comprising:
    a power drive unit operable to supply a drive force;
    at least two drive mechanisms each coupled to receive the drive force; and
    at least two actuator assemblies, each actuator assembly coupled to at least one of the drive mechanisms and operable to move, upon receipt of the drive force, between a stowed position and a deployed position;
    wherein the power drive unit includes
    a motor having a shaft with at least a first output and a second output, the motor operable to supply rotational power to a first and a second load, respectively,
        a first output section coupled to the first motor output and operable to decouple the motor from the first load upon a torque magnitude being reached in the first output section,
        a second output section coupled to the second motor output and operable to decouple the motor from the second load upon a torque magnitude being reached in the second output section, and
        a deadband coupler coupled to the first and second output sections and operable to selectively couple the first and second output sections together a time period after the first and second output sections have unequal rotational speeds.

2. The system unit of claim 1, wherein the first and second output sections comprise, respectively:
    a first torque decoupler having an input section coupled to the first motor output and an output section coupled to the first load and operable to decouple its input section from its output section upon a torque magnitude being reached therebetween; and
    a second torque decoupler having an input section coupled to the second motor output and an output section coupled to the second load and operable to decouple its input section from its output section upon a torque magnitude being reached therebetween.

3. The system of claim 2, wherein the first and second torque decoupler output sections are selectively coupled together upon one of the torque magnitudes being reached in one of the first and the second torque decouplers.

4. The system of claim 2, wherein the deadband coupler includes an engagement mechanism with two input shaft assemblies, each shaft assembly coupled to rotate from the drive force from one of the output sections, the shaft assemblies further each having engagement surfaces located to contact the engagement surface of the other shaft assembly after an amount of differential rotation between the shaft assemblies.

5. The system of claim 2, wherein the deadband coupler comprises:
    a quill shaft extending through the motor shaft and having a first end coupled to one of the first and second torque decoupler output sections and a second end rotationally mounted within the other of the first and second torque decoupler output sections;
    at least two deadband stops mounted on at least one of the first and second torque decoupler output sections,
    wherein the quill shaft contacts the deadband stops proximate its second end after the time period.

6. The system of claim 5, wherein the deadbands stops are spaced apart from one another and the spacing thereof sets the time period.

7. The system of claim 2, wherein the deadband coupler comprises:
    a first quill shaft extending at least partially through the motor shaft, the first quill shaft having a first end coupled to the first torque decoupler output section and a second end including having at least one contact surface proximate thereof;
    a second quill shaft extending at least partially through the motor shaft, the second quill shaft having a first end coupled to the second torque decoupler output section and a second end including at least one contact surface proximate thereof,
    wherein the first quill shaft contact surface and the second quill shaft contact surface contact one another after the time period.

8. The system of claim 7, wherein the first quill shaft and the second quill shaft contact surfaces are spaced apart from one another, and the spacing thereof sets the time period.

9. The system of claim 2, further comprising:
    a first gimbal spring coupling the first torque decoupler input section to the motor shaft first output; and
    a second gimbal spring coupling the second torque decoupler input section to the motor shaft second output.

10. The system of claim 2, further comprising:
    a first spring positioned between the first torque decoupler input section and the motor and configured to bias the first torque decoupler input section toward the first torque decoupler output section; and a second spring positioned between the second torque decoupler input section and the motor and configured to bias the second torque decoupler input section toward the second torque decoupler output section.

11. The system of claim 1, wherein the motor is an electric motor.

12. A power drive unit, comprising:

a motor having a shaft with at least a first output and a second output, the motor operable to supply rotational power to a first and a second load, respectively;

a first output section coupled to the first motor output and operable to decouple the motor from the first load upon a torque magnitude being reached in the first output section;

a second output section coupled to the second motor output and operable to decouple the motor from the second load upon a torque magnitude being reached in the second output section; and a deadband coupler coupled to the first and second output sections and operable to selectively couple the first and second output sections together a time period after the first and second output sections have unequal rotational speeds.

13. The power drive unit of claim 12, wherein the first and second output sections comprise, respectively:

a first torque decoupler having an input section coupled to the first motor output and an output section coupled to the first load and operable to decouple its input section from its output section upon a torque magnitude being reached therebetween; and a second torque decoupler having an input section coupled to the second motor output and an output section coupled to the second load and operable to decouple its input section from its output section upon a torque magnitude being reached therebetween.

14. The power drive unit of claim 13, wherein the first and second torque decoupler output sections are selectively coupled together upon one of the torque magnitudes being reached in one of the first and the second torque decouplers.

15. The power drive unit of claim 13, wherein the deadband coupler includes an engagement mechanism with two input shaft assemblies, each shaft assembly coupled to rotate from the drive force from one of the output sections, the shaft assemblies further each having engagement surfaces located to contact the engagement surface of the other shaft assembly after an amount of differential rotation between the shaft assemblies.

16. The power drive unit of claim 13, wherein the deadband coupler comprises:

a quill shaft extending through the motor shaft and having a first end coupled to one of the first and second torque decoupler output sections and a second end rotationally mounted within the other of the first and second torque decoupler output sections;

at least two deadband stops mounted on at least one of the first and second torque decoupler output sections, wherein the quill shaft contacts the deadband stops proximate its second end after the time period.

17. The power drive unit of claim 16, wherein the deadbands stops are spaced apart from one another and the spacing thereof sets the time period.

18. The power drive unit of claim 13, wherein the deadband coupler comprises:

a first quill shaft extending at least partially through the motor shaft, the first quill shaft having a first end coupled to the first torque decoupler output section and a second end including having at least one contact surface proximate thereof;

a second quill shaft extending at least partially through the motor shaft, the second quill shaft having a first end coupled to the second torque decoupler output section and a second end including at least one contact surface proximate thereof, wherein the first quill shaft contact surface and the second quill shaft contact surface contact one another after the time period.

19. The power drive unit of claim 18, wherein the first quill shaft and the second quill shaft contact surfaces are spaced apart from one another, and the spacing thereof sets the time period.

20. The power drive unit of claim 13, further comprising:

a first gimbal spring coupling the first torque decoupler input section to the motor shaft first output; and a second gimbal spring coupling the second torque decoupler input section to the motor shaft second output.

21. The power drive unit of claim 13, further comprising:

a first spring positioned between the first torque decoupler input section and the motor and configured to bias the first torque decoupler input section toward the first torque decoupler output section; and a second spring positioned between the second torque decoupler input section and the motor and configured to bias the second torque decoupler input section toward the second torque decoupler output section.

22. The power drive unit of claim 12, wherein the motor is an electric motor.

23. In a thrust reverser control system including a power drive unit having at least two output sections each coupled to at least one thrust reverser movable component, a method of operating the system, comprising:

rotating the power drive unit first and second output sections to move the thrust reverser movable components between a stow and a deploy position;

decoupling one of the power drive unit output section from its associated thrust reverser movable component upon a first torque magnitude being reached therebetween; and thereafter decoupling the other of the power drive unit output section from its associated thrust reverser movable component a first time period after the power drive unit output sections have unequal rotational speeds.

24. The method of claim 23, further comprising:

operably coupling the other power drive unit output section to the thrust reverser movable component that was initially coupled to the decoupled output section a second time period after the one output section is decoupled from its thrust reverser movable component.

25. The method of claim 23, wherein:

the other of the power drive unit output sections is decoupled from its associated thrust reverser movable component upon a second torque magnitude being reached therebetween; and the first and second torque magnitudes are substantially equal.

26. In a power drive unit including a motor having at least a first and a second output coupled to at least a first and a second power drive unit output section, respectively, a method of operating the power drive unit, comprising:

rotating the first and second motor outputs to thereby rotate the power drive unit first and second output sections;

decoupling one of the power drive unit output sections from its respective motor output upon a first torque magnitude being reached therebetween; and decoupling the other power drive unit output sections from its respective motor output a first time period after the power drive unit output sections have unequal rotational speeds.

27. The method of claim 26, further comprising:

operably coupling the first and second power drive unit output sections together a second time period after the one output section is decoupled from its respective motor output.

28. The method of claim 26, wherein:

the other of the power drive unit output sections is decoupled from its associated thrust reverser movable component upon a second torque magnitude being reached therebetween; and the first and second torque magnitudes are substantially equal.

* * * * *